United States Patent
Gilkey

(10) Patent No.: US 11,292,617 B1
(45) Date of Patent: Apr. 5, 2022

(54) SPIN-STABILIZED ORBITAL ROCKET GUIDANCE

(71) Applicant: National Technology & Engineering Solutions of Sandia, LLC, Albuquerque, NM (US)

(72) Inventor: Jeffrey C. Gilkey, Albuquerque, NM (US)

(73) Assignee: National Technology & Egineering Solutions of Sandia, LLC, Albuquerque, NM (US)

( * ) Notice: Subject to any disclaimer, the term of this patent is extended or adjusted under 35 U.S.C. 154(b) by 376 days.

(21) Appl. No.: 16/521,001

(22) Filed: Jul. 24, 2019

(51) Int. Cl.
*B64G 1/24* (2006.01)
*B64G 1/00* (2006.01)
*B64G 1/40* (2006.01)
*B64G 1/36* (2006.01)

(52) U.S. Cl.
CPC .............. *B64G 1/24* (2013.01); *B64G 1/002* (2013.01); *B64G 1/36* (2013.01); *B64G 1/403* (2013.01); *B64G 2001/245* (2013.01)

(58) Field of Classification Search
CPC . B64G 1/24; B64G 1/002; B64G 1/36; B64G 1/403; B64G 2001/245
See application file for complete search history.

(56) References Cited

U.S. PATENT DOCUMENTS

| | | | |
|---|---|---|---|
| 3,282,541 A | 11/1966 | Robbins et al. | |
| 3,350,886 A | 11/1967 | Feraud et al. | |
| 3,369,772 A * | 2/1968 | Eberlein | F41G 7/36 244/3.2 |
| 3,610,096 A | 10/1971 | Bauman et al. | |
| 3,758,051 A | 9/1973 | Williams | |
| 4,964,340 A * | 10/1990 | Daniels | B64G 1/244 60/225 |
| 5,678,784 A * | 10/1997 | Marshall, Jr. | B64G 1/14 244/171.4 |
| 5,810,297 A * | 9/1998 | Basuthakur | B64G 1/244 701/13 |
| 6,315,248 B1 | 11/2001 | Rockwell | |
| 6,612,522 B1 * | 9/2003 | Aldrin | B64G 1/002 244/171.1 |
| 6,840,481 B1 * | 1/2005 | Gurevich | B64G 1/646 244/172.4 |

(Continued)

FOREIGN PATENT DOCUMENTS

RU 2440281 C1 * 1/2012

*Primary Examiner* — Behrang Badii
*Assistant Examiner* — Jalal C Coduroglu
(74) *Attorney, Agent, or Firm* — Samantha Updegraff; Medley, Behrens & Lewis, LLC

(57) ABSTRACT

Technologies for guidance of a spin-stabilized orbital rocket are described herein. The spin-stabilized rocket includes a guidance controller. The guidance controller computes parameters of a burn of a second-stage engine of the rocket to reach a desired nominal orbit subsequent to burnout of the first stage of the rocket. The guidance controller computes the burn parameters of the second-stage engine based upon one or more desired orbit parameters and a current position and velocity of the rocket. The computation of the burn parameters is based upon a simulated point-mass model of the motion of the rocket. The guidance controller then controls the rocket to initiate a second-stage burn having the computed burn parameters.

20 Claims, 7 Drawing Sheets

(56) References Cited

U.S. PATENT DOCUMENTS

| | | | | |
|---|---|---|---|---|
| 7,104,507 B1* | 9/2006 | Knight | F02K 9/42 | |
| | | | 244/171.1 | |
| 7,458,544 B1* | 12/2008 | Sarigul-Klijn | B64D 1/12 | |
| | | | 244/137.3 | |
| 9,303,971 B1* | 4/2016 | Butscher | G01B 7/30 | |
| 10,994,842 B1* | 5/2021 | Skylus | B64C 30/00 | |
| 11,041,692 B1* | 6/2021 | Chromych | F41F 3/0413 | |
| 2003/0036826 A1* | 2/2003 | Turner | B64G 1/244 | |
| | | | 701/13 | |
| 2005/0230517 A1* | 10/2005 | Troy | F42B 12/58 | |
| | | | 244/171.3 | |
| 2006/0208136 A1* | 9/2006 | Cook | B64G 1/005 | |
| | | | 244/171.3 | |
| 2007/0125910 A1* | 6/2007 | Cepollina | B64G 1/007 | |
| | | | 244/172.6 | |
| 2007/0228219 A1* | 10/2007 | Behrens | B64G 1/1078 | |
| | | | 244/172.5 | |
| 2008/0296436 A1* | 12/2008 | DAusilio | G01J 3/433 | |
| | | | 702/76 | |
| 2011/0268816 A1* | 11/2011 | DeBoer | B64G 1/62 | |
| | | | 424/613 | |
| 2014/0077036 A1* | 3/2014 | Healy | B64G 1/242 | |
| | | | 244/158.8 | |
| 2015/0121060 A1* | 4/2015 | Mimms | G06F 8/65 | |
| | | | 713/100 | |
| 2015/0323448 A1* | 11/2015 | Rakeman | G01J 3/433 | |
| | | | 702/76 | |
| 2017/0036782 A1* | 2/2017 | Dula | B64G 1/402 | |
| 2017/0131409 A1* | 5/2017 | Irish | G01S 19/428 | |
| 2019/0068953 A1* | 2/2019 | Choi | G03B 15/006 | |

* cited by examiner

SPIN-STABILIZED ORBITAL ROCKET GUIDANCE

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

During an orbital ascent trajectory, a rocket is commonly subject to various external forces and un-modeled phenomena that act unpredictably on the rocket. These forces and other phenomena can cause the rocket to diverge from an intended trajectory of the rocket, referred to as a nominal trajectory of the rocket. Conventionally, rockets have been equipped with thrust vectoring systems to allow a rocket to correct for such divergence as it occurs. However, thrust vectoring systems generally increase the size, weight, complexity, and cost of a rocket. For some rockets these increases may be prohibitive given various mission-dependent constraints.

SUMMARY

The following is a brief summary of subject matter that is described in greater detail herein. This summary is not intended to be limiting as to the scope of the claims.

A spin-stabilized rocket is described herein, wherein the spin-stabilized rocket is configured to maneuver to a nominal orbit trajectory without thrust vector control. In an exemplary embodiment, a spin-stabilized rocket includes a plurality of stages, wherein each stage includes a respective rocket engine and fuel casing. Each stage is connected to upper stages by a separable mechanical linkage. When the fuel for a stage is depleted, the engine and spent fuel casing for the stage are jettisoned and the engine for a next stage of the rocket can be ignited. During at least one of the stages of the rocket, a spin is imparted to the rocket about its longitudinal axis to gyroscopically stabilize the rocket. For example, the spin can be imparted to the rocket by fins that are attached to the first stage of the rocket. In another example, spin can be imparted to the rocket by way of reaction control system (RCS) thrusters that are mounted on one or more stages of the rocket.

Imparting spin to the rocket can stabilize the rocket and obviate the need for thrust vectoring to correct for minor perturbations of the rocket along a straight-line trajectory. However, thrust vectoring is also conventionally used for performing orbital insertion maneuvers by implementing course changes during a burn of one or more rocket stage engines. In the absence of thrust vectoring, other means are necessary for implementing orbital insertion maneuvers.

Further described herein are technologies relating to guidance of a rocket into a nominal orbit without using thrust vectoring. In an exemplary embodiment, a spin-stabilized rocket comprises a plurality of stages. The rocket includes a guidance controller that is programmed with a nominal orbit to which the rocket is desirably guided. Subsequent to burnout of the first stage of the rocket, the guidance controller is configured to compute burn parameters for a second stage of the rocket that will cause the rocket to proceed along a trajectory to the nominal orbit. The guidance controller computes the burn parameters for the second stage burn based upon a current position and velocity of the rocket. In exemplary embodiments, the burn parameters for the second stage burn can be or include ignition time of the second stage engine, pitch angle of the rocket during the second stage burn, and/or yaw angle of the rocket during the second stage burn.

In various embodiments, the spin-stabilized rocket can include a plurality of more than two stages. In such embodiments, the guidance controller can compute burn parameters for succeeding stages, after each stage completes its burn. By way of example, and not limitation, the spin-stabilized rocket can be a three-stage rocket. The guidance controller can, subsequent to completion of the first-stage burn, compute burn parameters for each of the second and third stages. Solving for the burn parameters of the third stage simultaneously with the second stage allows the guidance controller to compute second stage burn parameters that place the rocket on a trajectory that allows the third stage to take the rocket to the nominal orbit. The guidance controller can then control the second stage of the rocket based upon the computed burn parameters of the second stage. Once the second stage burn has completed, the guidance controller can recompute the third stage burn parameters to account for any discrepancies between nominal and actual trajectory during burn of the second stage.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
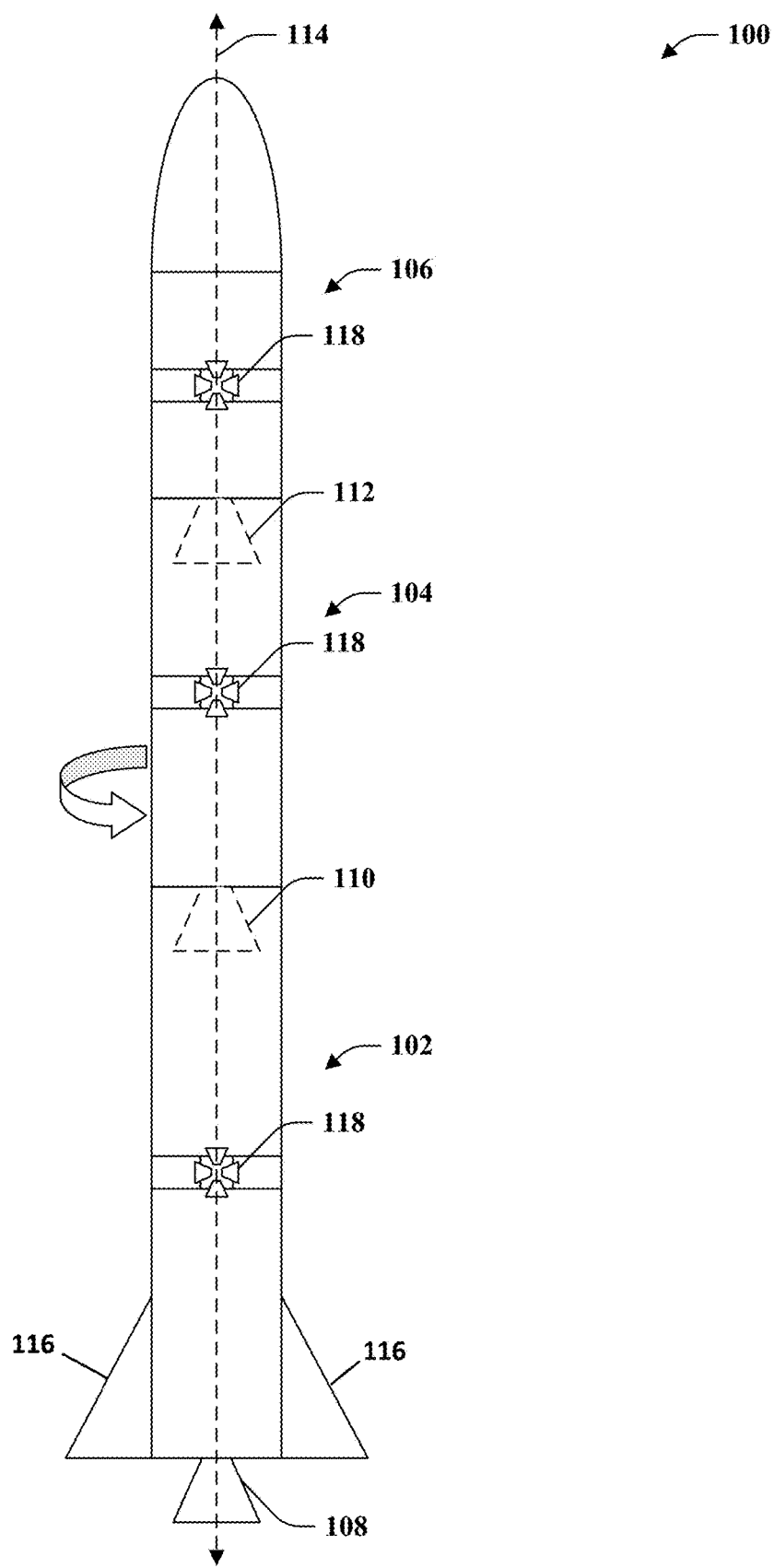
FIG. 1 is a diagram of an exemplary spin-stabilized rocket.

Various technologies pertaining to guidance of a spin-stabilized rocket along an orbital insertion trajectory are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

With reference to FIG. 1, an exemplary spin-stabilized rocket 100 is illustrated. The spin-stabilized rocket 100 has a plurality of three stages 102, 104, 106. The first stage 102 is the lowest stage of the rocket 100 and includes a first engine 108 that accelerates all three stages 102-106 of the rocket 100 during an initial phase of the trajectory of the rocket 100. The second stage 104 is a next-highest stage of the rocket 100 and includes a second engine 110 that accelerates the second stage 104 and the third stage 106 of the rocket 100 during a second phase of the trajectory of the rocket 100. The third stage 106 is the last stage of the rocket 100 and includes a third engine 112 that accelerates the third stage 106 during a third phase of the trajectory of the rocket 100 (e.g., a phase including orbital insertion of the rocket 100). While certain aspects are described herein with respect to the exemplary three-stage spin-stabilized rocket 100, it is to be understood that the technologies set forth herein are applicable to rockets of substantially any number of stages that may be desirably employed in a given application of a rocket.

The rocket 100 is configured to be spun about its longitudinal axis 114 during flight to gyroscopically stabilize the rocket 100 against minor perturbations to the rocket 100 as it travels along its trajectory. The rocket 100 can be spun about the longitudinal axis 114 by way of various means. By way of example, the rocket 100 can include fins 116 or other aerodynamic elements that are configured such that the movement of air over the fins while the rocket is in the atmosphere develops forces that act to spin the rocket 100 about the axis 114. In another example, the rocket 100 can include a reaction control system (RCS) that includes a plurality of thrusters 118. The thrusters 118 can be controlled (e.g., as described in greater detail below with respect to FIG. 2) to emit propellant gases to develop forces that tend to spin the rocket 100 about the axis 114.

As noted above, an advantage of a spin-stabilized rocket is that the rocket does not require thrust-vectoring control of its engines in order to maintain stability along its nominal trajectory against various perturbations. However, thrust-vectoring is also commonly employed to perform maneuvers to guide rockets along their nominal trajectories. While nominal burn parameters (e.g., ignition time, position of the rocket at ignition, etc.) for various engine stages can be determined in advance of launch in order for a rocket to reach a desired nominal orbital trajectory, various effects including variations in rocket engine performance can cause a rocket to deviate from the nominal trajectory. A rocket employing burn parameters calculated in advance can therefore fall short of its nominal orbit or end up in a trajectory from which a mission of the rocket cannot be completed.

Figure 2:
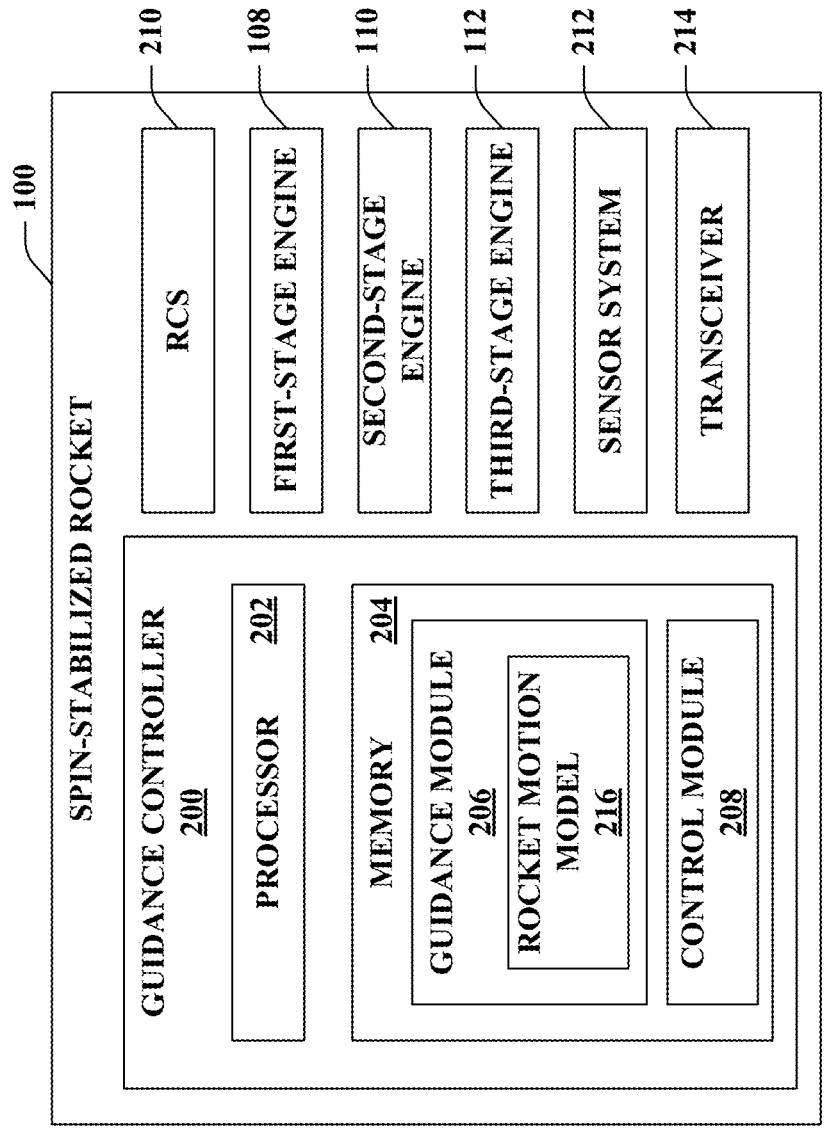
FIG. 2 is a functional block diagram of the exemplary spin-stabilized rocket of FIG. 1.

Referring now to FIG. 2, a functional block diagram of the spin-stabilized rocket 100 is shown that depicts various features relating to guidance and control of the rocket 100 that allow the rocket 100 to guide itself to a desired nominal orbit trajectory without the use of thrust-vectoring engines. The rocket 100 includes a guidance controller 200 that is configured to compute burn parameters for the second- and third-stage engines 110, 112 during flight of the rocket 100, based upon present position and velocity of the rocket 100. The guidance controller 200 is depicted in FIG. 2 and described herein as including a processor 202 and memory 204 that is operably coupled to the processor 202, the memory 204 storing instructions that are executable by the processor 202. However, it will be understood by those of skill in the art that the guidance controller 200 can be embodied by any of various types of hardware logic devices suitably configured to perform functionality described herein with respect to the guidance controller 200.

The memory 204 includes a guidance module 206 and a control module 208. The guidance module 206 is configured to compute burn parameters for at least the second-stage engine 110 and the third-stage engine 112 of the rocket 100. The guidance module 206 can further be configured to compute burn parameters for the first-stage engine 108. In other embodiments, burn parameters of the first-stage engine 108 can be computed in advance and operation of the first stage-engine 108 controlled by a launcher, as described in greater detail below.

The control module 208 is configured to control any or all of the engines 108-112 based upon burn parameters computed by the guidance module 206. The control module 208 can further be configured to control other systems that may be included on the rocket 100. By way of example, the rocket 100 can include an RCS system 210 (e.g., that includes the thrusters 118) that can be used to control orientation of the rocket 100. The control module 208 can be configured to control the RCS system 210 to position the rocket 100 such that the rocket has a desired orientation (e.g., an orientation computed by the guidance module 206 for a burn of the second-stage engine 110 or the third-stage engine 112).

As shown in FIG. 2, the rocket 100 can further include a sensor system 212 and a transceiver 214. The sensor system 212 can be or include any of various types of sensors such as an inertial guidance sensor, a ranging sensor such as a radar sensor or lidar sensor, or the like. The transceiver 214 can be configured to transmit and receive data to/from ground stations, satellites, other spacecraft, etc. As described in greater detail below, the guidance controller 200 can be configured to compute burn parameters for the engines 108-112 of the rocket 100 based upon data received from the sensor system 212 and/or the transceiver 214.

Figure 3:
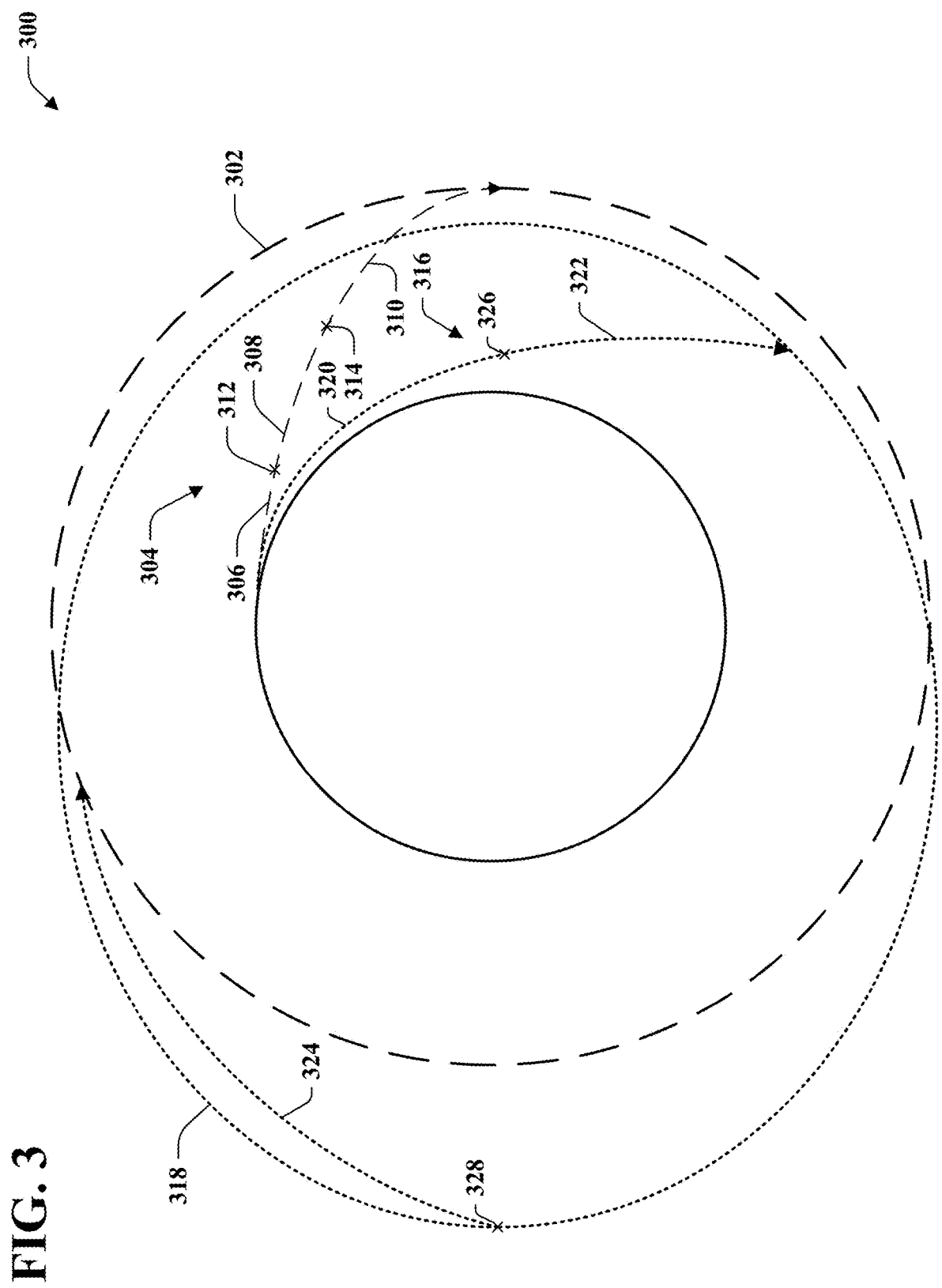
FIG. 3 is a conceptual diagram of exemplary orbital trajectories of a spin-stabilized rocket.

Various details pertaining to operation of the rocket 100 and the guidance controller 200 with respect to guidance of the rocket 100 to a nominal orbital trajectory are now set forth. With reference now to FIG. 3, a conceptual diagram 300 of an exemplary orbital insertion is shown. The diagram 300 depicts a desired nominal orbit 302 and an orbital ascent trajectory 304 for a three-stage rocket (e.g., the rocket 100) in connection with reaching the nominal orbit 302. The orbital ascent trajectory 304 includes a first phase 306 during which a burn of the first stage engine occurs and is completed, a second phase 308 during which a burn of the second-stage engine occurs and is completed, and a third phase 310 during which a burn of the third-stage engine occurs and is completed. A location of the second-stage burn 312 marks the transition from the first phase 306 to the second phase 308, while a location of the third-stage burn 314 marks the transition from the second phase 308 to the third phase 310. Upon completion of the third phase 310 of the orbital ascent trajectory 304, the rocket travels along the nominal orbit 302.

For many orbits, however, it may be desirable to place the rocket in an intermediate insertion orbit prior to the nominal orbit 302 in order to save fuel or increase margins of allowable control error. For example, a rocket can be positioned in an insertion orbit that may have a greater eccentricity and/or a greater difference between periapsis and apoapsis altitudes than the desired nominal orbit 302. The insertion orbit can then be circularized or otherwise modified by way of burns of the engines of a rocket in order to match the nominal orbit 302.

In a non-limiting example, FIG. 3 depicts a second orbital ascent trajectory 316 that places the rocket into an insertion orbit 318 prior to the rocket entering the nominal orbit 302. Like the first orbital ascent trajectory 304, the second orbital ascent trajectory can be separated into a first phase 320, a second phase 322, and a third phase 324 that are separated by locations of a second-stage burn 326 and a third-stage burn 328. In the exemplary second orbital ascent trajectory 316, the second-stage burn at 326 places the rocket into the insertion orbit 318. The third-stage burn at 328 subsequently modifies the orbital trajectory of the rocket to match the nominal orbit 302, thereby moving the rocket from the insertion orbit 318 to the nominal orbit 302.

It is to be understood that while the exemplary maneuvers depicted in FIG. 3 are illustrated for conceptual simplicity, more complex maneuvers of a rocket are contemplated as being within the scope of the present disclosure. For example, a burn of a third-stage or later-stage engine of a rocket to modify and circularize the insertion orbit 318 to match the nominal orbit 302 could involve a plurality of burns of the third-stage engine at various locations rather than a single burn at a single location.

Referring once again to FIG. 2, the guidance controller 200 is programmed prior to launch with one or more desired orbit parameters that define a nominal orbit into which the rocket 100 is desirably inserted. In various exemplary embodiments, the orbital parameters include parameters defined with respect to the nominal orbit itself. By way of example, such parameters can include altitudes of the non-insertion apsides, altitudes of the insertion apsides, and orbital inclination. In other embodiments, the desired orbit parameters can be defined relative to the rocket itself. For instance, the orbital parameters can include altitude at burnout of the final stage of the rocket, flight path angle at burnout, and the magnitude of velocity of the rocket at burnout of the final stage. The guidance controller 200 can further be programmed with a nominal trajectory that is representative of an optimal trajectory to the desired nominal orbit.

Figure 4:
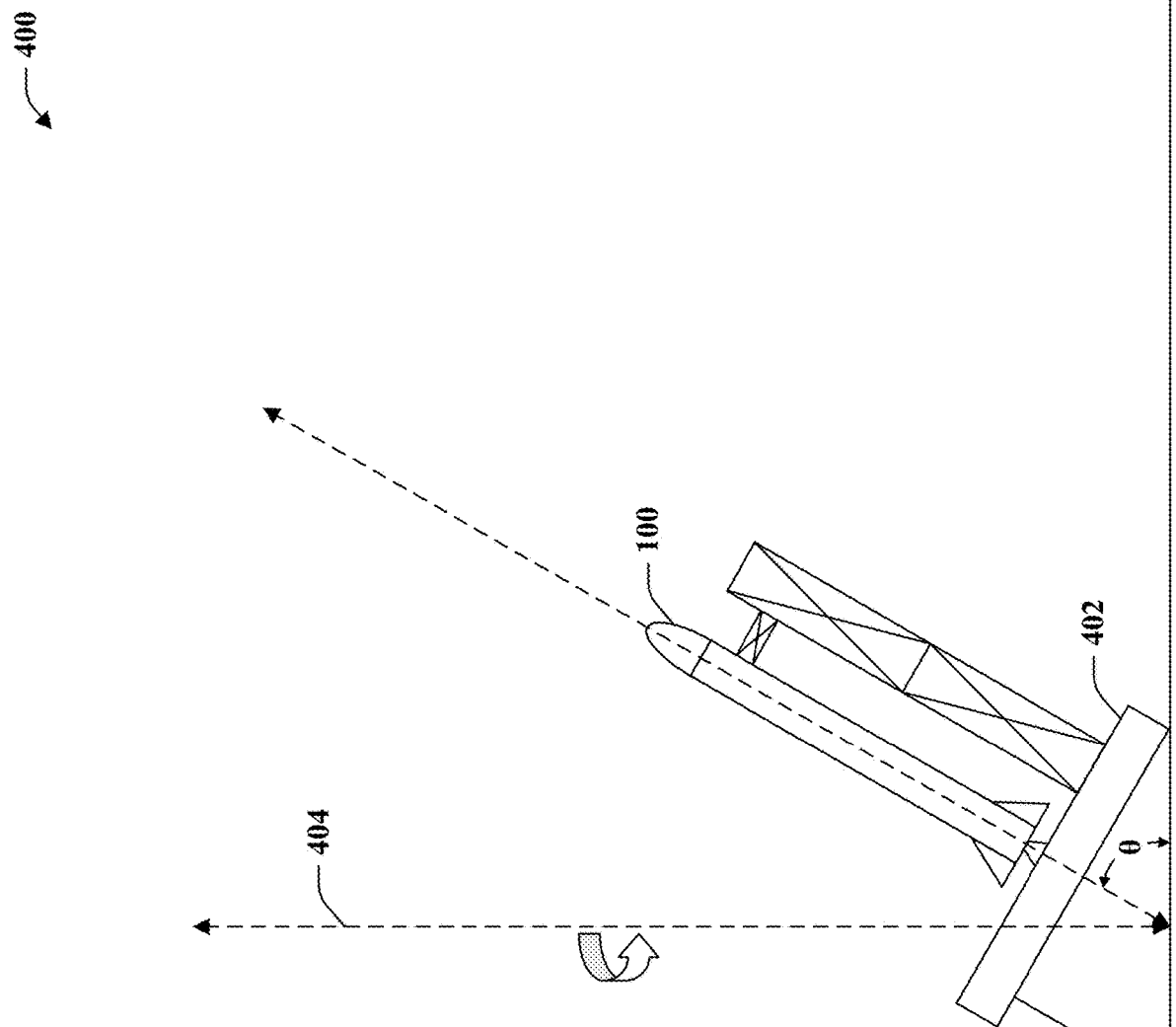
FIG. 4 is a diagram illustrating orientation features of an exemplary launcher for a spin-stabilized rocket.

With reference now to FIG. 4, an exemplary launch system 400 for the spin-stabilized rocket 100 is illustrated. The launch system 400 includes a launch pad 402 that is orientable in azimuth about a first axis 404 and is further orientable in elevation angle θ. The azimuth of the launch pad 402 can be selected such that the trajectory of the rocket 100 during burn of the first-stage engine 108 has an inclination near the inclination of the nominal orbit. The elevation angle θ of the launch pad 402 is set to the insensitive angle at which perturbations of the launch pad 402 have a minimum effect on the trajectory of the rocket 100 during the first-stage burn.

Referring once again to FIG. 2, the guidance module 206 is configured to compute guidance parameters for a burn of the second-stage engine 110 subsequent to burnout of the first-stage engine 108. The guidance module 206 can therefore identify burn parameters for the second-stage engine 110 that allow the second-stage engine 110 to take into account trajectory deviations that may have arisen due to non-idealities in the burn of the first-stage engine 108.

In exemplary embodiments, the guidance module 206 computes burn parameters for the second-stage engine 110 by modeling motion of the rocket 100 in a rocket motion model 216. In a non-limiting example, the rocket motion model 216 models the rocket 100 as a single point-mass with motion of the rocket 100 modeled by equations of motion in three spatial dimensions propagated numerically using $4^{th}$ order Runge-Kutta methods. The rocket motion model 216 can assume any of various models of gravitational acceleration of the rocket 100 due to Earth's gravity. In an example, the rocket motion model 216 can assume an oblate Earth model that is based upon the World Geodetic System 84 (WGS-84) Earth model. In another example, the rocket motion model 216 can model the Earth's gravity as arising from a single point-mass at the Earth's center. The rocket motion model 216 can model acceleration of the rocket 100 due to burn of engines of the rocket 100 based upon an orientation of the rocket 100 and a lookup table of acceleration magnitude of the rocket over a period of time from ignition of the engines. The lookup table of acceleration magnitude of the rocket can be based upon known nominal thrust and mass of the rocket 100 during burns of the second- or third-stage engines. The rocket motion model 216 can include separate acceleration magnitude lookup tables for each of the stages of the rocket 100 to account for differences in mass of the rocket 100 and thrust of the engines from one stage to the next. In various embodiments, the rocket motion model 216 can be configured to neglect drag in order to simplify computation of the equations of motion for the rocket 100. In further exemplary embodiments, the rocket motion model 216 can employ an Earth-centered inertial coordinate system using the orientation of Earth at launch (t=0) as the inertial reference frame, with position vector (x, y, z) being relative to the center of the Earth.

The guidance module 206 determines burn parameters of the second-stage engine 110 by way of the rocket motion model 216 based upon a current position of the rocket 100 and a current velocity of the rocket 100. The guidance module 206 can receive data indicative of the current position and current velocity of the rocket 100 from the sensor systems 212 mounted on the rocket 100 or from ground tracking stations by way of the transceiver 214. In exemplary embodiments, the burn parameters of the second-stage burn can include ignition time of the second-stage engine 110 and orientation of the rocket 100 (e.g., as indicated by inertial pitch angle and inertial yaw angle) during the second-stage burn, where the orientation of the rocket 100 is taken as constant throughout the burn. In order to identify burn parameters that will place the rocket 100 in the desired nominal orbit, the guidance module 206 solves a plurality of constraint equations that are based upon the desired parameters of the nominal orbit. The guidance module 206 solves the constraint equations based upon the rocket motion model 216, taking the current position and velocity of the rocket 100 and the burn parameters as inputs to the rocket motion model 216. In connection with solving for the burn parameters of the second-stage engine 110, the guidance module 206 solves for burn parameters of both the second-stage engine 110 and the third-stage engine 112 to ensure that the burn of the second-stage engine 110 places the third stage 112 of the rocket 100 in a position from which the third-stage engine 112 can reach the desired nominal orbit.

By way of example, the guidance module 206 can solve for burn parameters of a second-stage ignition time, a second stage inertial pitch angle, a second stage yaw angle, a third stage ignition time, a third stage inertial pitch angle, and a third stage yaw angle. The guidance module 206 can solve for these burn parameters by modeling motion of the rocket 100 in the rocket motion model 216 subject to constraint equations based upon the desired orbital parameters of the nominal orbit. In a non-limiting example, the constraint equations can specify that the orbital insertion altitude of the rocket 100 is the desired insertion altitude, that the insertion velocity of the rocket 100 is equal to or greater than a value that results in desired non-insertion apsides, that the flight path angle of the rocket 100 at orbital insertion is equal to zero relative to the nominal orbital trajectory (i.e., the velocity vector of the rocket 100 at insertion is tangential to the trajectory of the nominal orbit), and that the orbit inclination is equal to the desired orbit inclination. It is to be understood that other suitable constraint equations may be used by the guidance module 206 to compute second- or third-stage burn parameters.

For example, further constraints can be imposed on the values of the second- or third-stage burn parameters in order to simplify computation of the second-stage burn parameters. In exemplary embodiments, the guidance module 206 can impose a constraint that the inertial yaw angles for the second- and third-stage burns are equal, which maximizes payload capability of the rocket 100. In other exemplary embodiments, the guidance module 206 can impose a constraint that the third-stage ignition time is equal to the third-stage ignition time of a nominal trajectory of the rocket 100 to the desired nominal orbit. Imposing these constraints on solution of the second-stage burn parameters by the guidance module 206 can reduce a number of burn parameters to be solved for by the guidance module 206.

The guidance module 206 computes a solution of the constraint equations based on the rocket motion model 216 of the rocket 100, wherein the solution comprises burn parameters of the second-stage engine 110 and one or more burn parameters of the third-stage engine 112. The solution is indicative that the computed second- and third-stage burn parameters are sufficient to place the rocket 100 in the desired nominal orbit given nominal performance of the second-stage engine 110 and the third-stage engine 112.

Responsive to the guidance module 206 computing the second-stage burn parameters, the control module 208 outputs control signals to systems of the rocket 100 to implement a burn of the second-stage engine 110 having the computed second-stage burn parameters. The control module 208 outputs control signals to the RCS 210 that cause the RCS 210 to position the rocket 100 (e.g., by way of the thrusters 118) to have the orientation specified by the second-stage burn parameters. Once the rocket 100 is positioned in this orientation, the control module 208 outputs a control signal to the second-stage engine 110 to cause the second-stage engine 110 to initiate a burn at the ignition time specified by the second-stage burn parameters.

Subsequent to burnout of the second-stage engine 110, the guidance controller 200 recomputes burn parameters for a burn of the third-stage engine 112. The guidance module 206 computes the burn parameters for the third-stage burn based upon the current position and velocity of the rocket 100 after the second-stage burn, and desired parameters of the nominal orbit. The guidance module 206 solves for third-stage inertial pitch angle, third-stage inertial yaw angle, and ignition time for the third-stage engine 112. The guidance module 206 solves for these burn parameters based upon the rocket motion model 216 subject to constraint equations that are based upon the desired orbit parameters of the nominal orbit. By way of example, the constraint equations for computing the third-stage burn parameters can specify that the insertion altitude of the rocket 100 is equal to the desired insertion altitude, that the insertion velocity of the rocket 100 is equal to a value that results in desired non-insertion orbital apsides, and/or that the flight path angle of the rocket 100 at insertion is equal to zero relative to the nominal orbital path.

Responsive to the guidance module 206 computing the burn parameters for the third-stage burn, the control module 208 controls the RCS 210 to position the rocket 100 to have the orientation (e.g., inertial pitch angle, inertial yaw angle) indicated in the computer third-stage burn parameters. When the rocket 100 is positioned with the computer orientation, the control module 208 controls the third-stage engine 112 to ignite at the ignition time indicated in the third-stage burn parameters.

The guidance technologies described herein with respect to the spin-stabilized rocket 100 improve robustness of the rocket 100 to perturbations and sub-nominal performance of the engines 108-112. By computing burn parameters of later-stage engines (e.g., the second-stage engine 110 and the third-stage engine 112), the guidance controller 200 prevents trajectory errors in preceding stages of the rocket 100 from compounding through subsequent stages. Guidance technologies described herein can further require less power or computing resources than technologies that require repeated computation of control and guidance parameters during engine burns. The guidance module 206 can be configured to only compute the burn parameters of a next stage once, subsequent to burnout of the preceding stage. The control module 208 then uses the same burn parameters throughout the burn of the next stage engine.

Technologies described herein with respect to guidance of the spin-stabilized rocket 100 are also well-suited to use in rockets that are powered by solid-fuel rocket engines, which cannot generally be throttled down or off once ignited. Techniques that require thrust changes throughout a burn of a rocket engine are unsuitable to rockets using solid-fuel engines. By contrast, the guidance technologies described herein contemplate that the engines 108-112 of the spin-stabilized rocket 100 can be controlled to have a same course and continual thrust throughout their burns.

In order to further improve the robustness of the rocket 100 to below-nominal performance of either of the second-stage engine 110 or the third-stage engine 112, the guidance module 206 can be configured to implement deviations from the pre-launch nominal trajectory when computing the burn parameters of the second-stage engine 110 and the third-stage engine 112. By way of example, the guidance module 206 can delay or advance the second-stage ignition time from a nominal second-stage ignition time in order to account for first-stage velocity being greater than or less than nominal, respectively.

In another example, the guidance module 206 can compute second-stage burn parameters that result in the rocket 100 having excess velocity at the insertion apsides for the desired non-insertion apsides. The excess velocity resulting from the second-stage burn parameters allow the third-stage to still reach the desired insertion and non-insertion apsides if the second-stage burn does not result in the expected change in velocity. In an embodiment, the excess velocity can be set by the guidance module 206 based upon a known variation of performance of the second-stage engine 110. The excess velocity can further be used by the guidance module 206 to modify the orbit inclination in the third-stage burn if the orbit inclination of the rocket 100 has deviated from the desired nominal orbit inclination.

In yet another example deviation, the guidance module 206 can be configured to compute burn parameters that target a non-zero burn down angle for the third-stage engine 112. In this example, if the second-stage engine 110 burn is sub-nominal and would cause the trajectory to fall short of the desired nominal insertion apsides, the guidance module 206 can vary the ignition time and pitch angle of the burn of the third-stage engine 112 such that the rocket 100 arrives at the desired insertion apsides altitude with a flight angle of zero relative to the orbital path.

In some cases, the guidance controller 200 may be unable to find burn parameters of the second-stage engine 110 or the third-stage engine 112 that will allow the rocket 100 to reach the nominal orbit. For instance, a large trajectory perturbation during a burn of the first-stage engine 108 can place the rocket 100 in a position from which it is impossible to reach the nominal orbit given remaining fuel available. In another example, sub-nominal performance of an engine can cause the rocket 100 to have a lower velocity than indicated in the nominal trajectory. Therefore, the guidance module 206 can be configured to compute a salvage orbit that is reachable by the rocket 100 when the guidance module 206 determines that the nominal orbit is unattainable.

Figure 5:
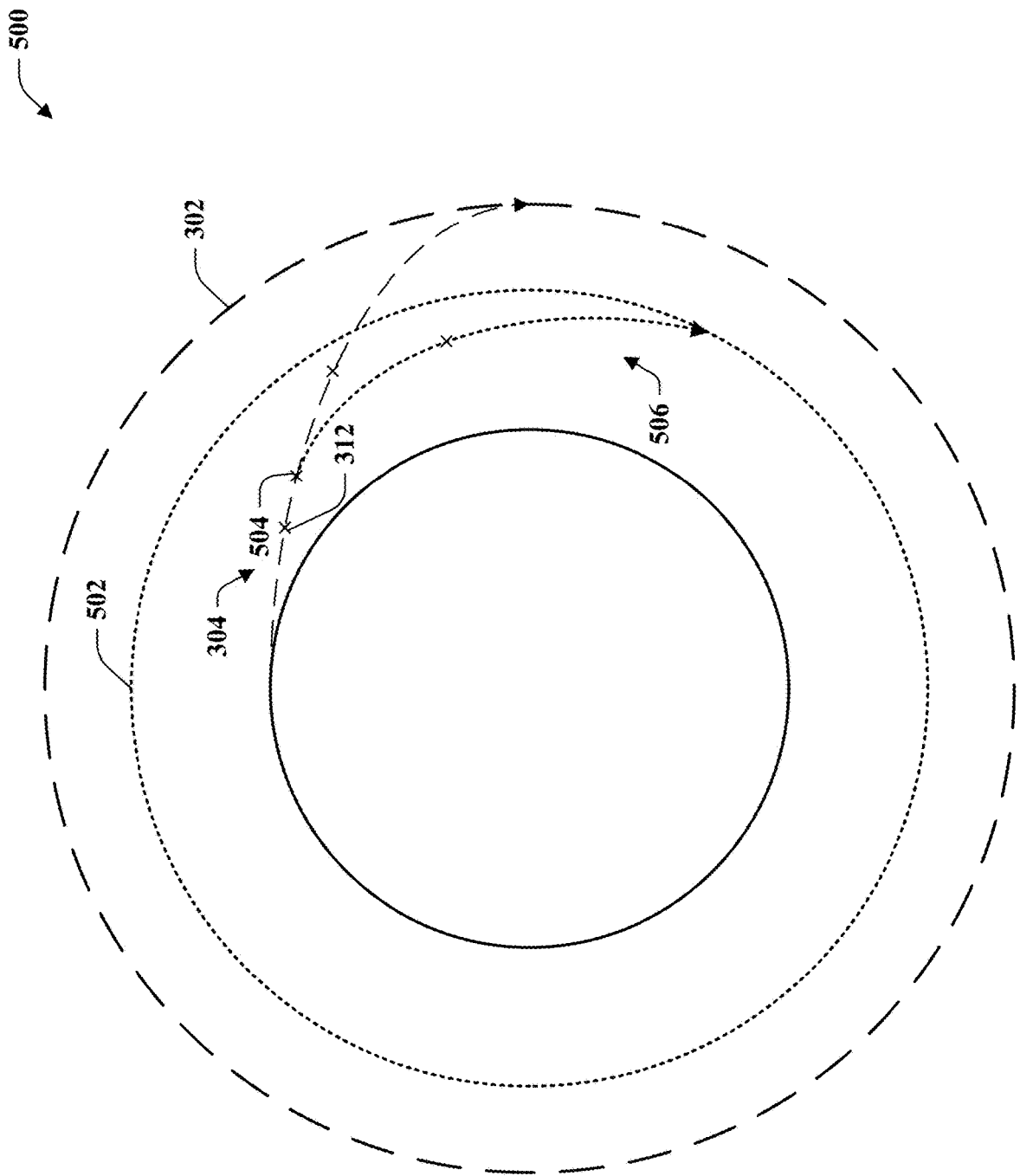
FIG. 5 is a conceptual diagram illustrating an exemplary salvage orbit.

For example, and with reference now to FIG. 5, a conceptual diagram 500 of the nominal orbit 302 and a lower-energy salvage orbit 502 is illustrated. The lower-energy salvage orbit 502 may be reachable by the second- and third-stages of the rocket 100 even if the nominal orbit 302 is unreachable. In the exemplary conceptual diagram 500, at a location of the second-stage burn 504 the rocket 100 deviates from the orbital trajectory 304 to a salvage orbital trajectory 506 that is configured to place the rocket 100 in the salvage orbit 502. As shown in FIG. 5, the location of the second-stage burn 504 in the salvage trajectory 506 may be different from a location of the second-stage burn along a nominal orbit trajectory (e.g., the second-stage burn location 312). The salvage orbit 502 can be an orbit from which the rocket 100 is still able to complete its mission. By allowing the rocket 100 to reach the salvage orbit 502, the guidance controller 200 can improve the ability of the rocket 100 to achieve its objectives even when the nominal orbit 302 is unreachable.

Referring once again to FIG. 2, in an exemplary embodiment the guidance module 206 can be configured to determine that the rocket 100 is unable to reach the nominal orbit based upon a threshold amount of time or a threshold number of processing cycles of the guidance controller 200 having passed in connection with computing the second- or third-stage burn parameters. Responsive to determining that the rocket 100 is unable to reach the nominal orbit, the guidance module 206 can compute a salvage orbit that is based upon an orbit parameter specified for the nominal orbit.

By way of example, and not limitation, the guidance module 206 can compute the salvage orbit to be a first salvage orbit having the highest non-insertion apsides reachable by the rocket 100 given the insertion apsides of the nominal orbit. In another example, the guidance module 206 can compute the salvage orbit to be a second salvage orbit having the highest insertion apsides reachable by the rocket 100 given the non-insertion apsides of the nominal orbit. In still another example, the guidance module 206 can compute the salvage orbit to be a third salvage orbit having a minimum eccentricity attainable by the rocket 100. In still further embodiments, the guidance module 206 can successively compute salvage orbits such that if the guidance module 206 is unable to identify an attainable salvage orbit according to first desired parameters, the guidance module 206 computes a salvage orbit having second desired parameters.

Responsive to computing the salvage orbit, the guidance module 206 can compute burn parameters for the second-stage engine 110 and the third-stage engine 112 based upon orbit parameters for the salvage orbit. In an example, the guidance module 206 can solve for the burn parameters based upon constraint equations that are defined in terms of orbit parameters of the salvage orbit, similarly to the manner described above with respect to nominal orbit parameters. Therefore, the guidance module 206 computes burn parameters that are configured to guide the rocket 100 to the salvage orbit when the desired nominal orbit is unattainable. The control module 208 can subsequently control the rocket 100 based upon the computed burn parameters in order to place the rocket 100 in the salvage orbit.

Figure 6:
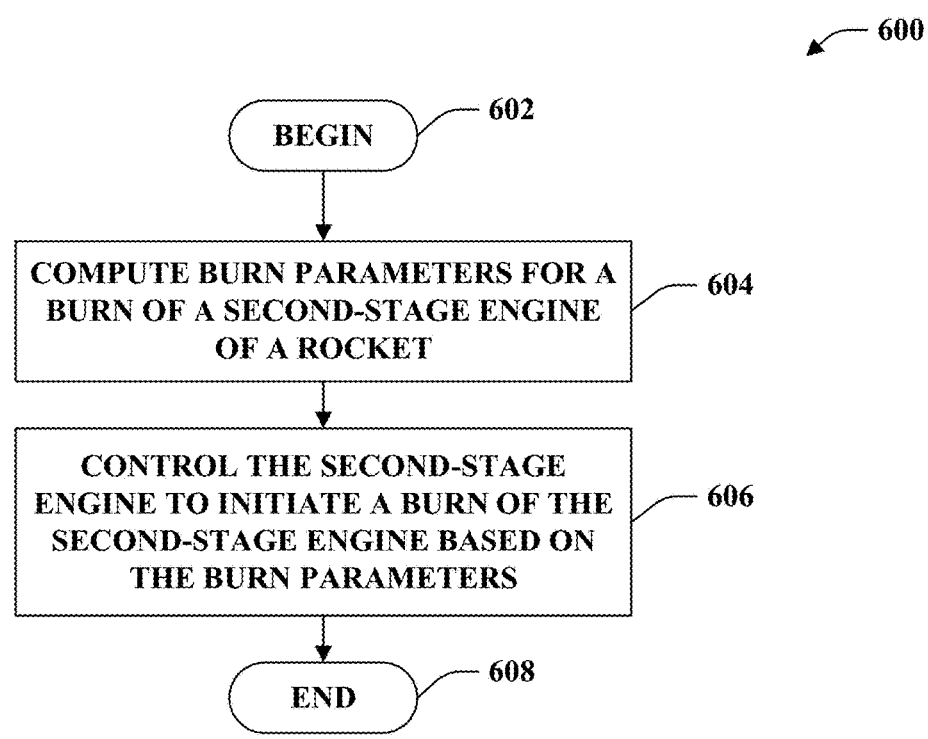
FIG. 6 is a flow diagram that illustrates an exemplary methodology for guidance control of a spin-stabilized rocket.

FIG. 6 illustrates an exemplary methodology relating to guidance of a spin-stabilized orbital rocket. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors or hardware logic devices and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 6, a methodology 600 that facilitates guidance of a spin-stabilized rocket to a desired orbital trajectory is illustrated. The methodology 600 begins at 602, and at 604, burn parameters for a second-stage engine of a spin-stabilized rocket are computed. The burn parameters of the second-stage engine are computed subsequent to completion of a burn of a first-stage engine of the spin-stabilized rocket. The burn parameters of the second-stage engine are computed based upon a model of rocket motion that takes into account current position of the rocket, current velocity of the rocket, and one or more desired orbit parameters that define a nominal orbit that is desirably reached by the rocket. The burn parameters of the second-stage engine include an orientation of the rocket (e.g., a yaw angle and a pitch angle of the rocket relative to an inertial reference frame) and an ignition time of the second-stage engine. At 606, the second-stage engine is controlled to initiate a burn of the second-stage engine based upon the burn parameters computed at 604. By way of example, the second-stage engine can be controlled to initiate the burn at the ignition time indicated in the computed burn parameters when the rocket has the orientation indicated in the burn parameters. The methodology completes at 608. In exemplary embodiments, the methodology 600 can be performed in connection with controlling operation of a rocket that has substantially any number of stages, as described in greater detail above. For instance, subsequent to completion of the methodology 600 (e.g., subsequent to completion of the burn of the second-stage engine of the rocket) burn parameters can be computed for a third-stage engine of the rocket. The third-stage engine can then be controlled to initiate a burn based upon the third-stage burn parameters.

Figure 7:
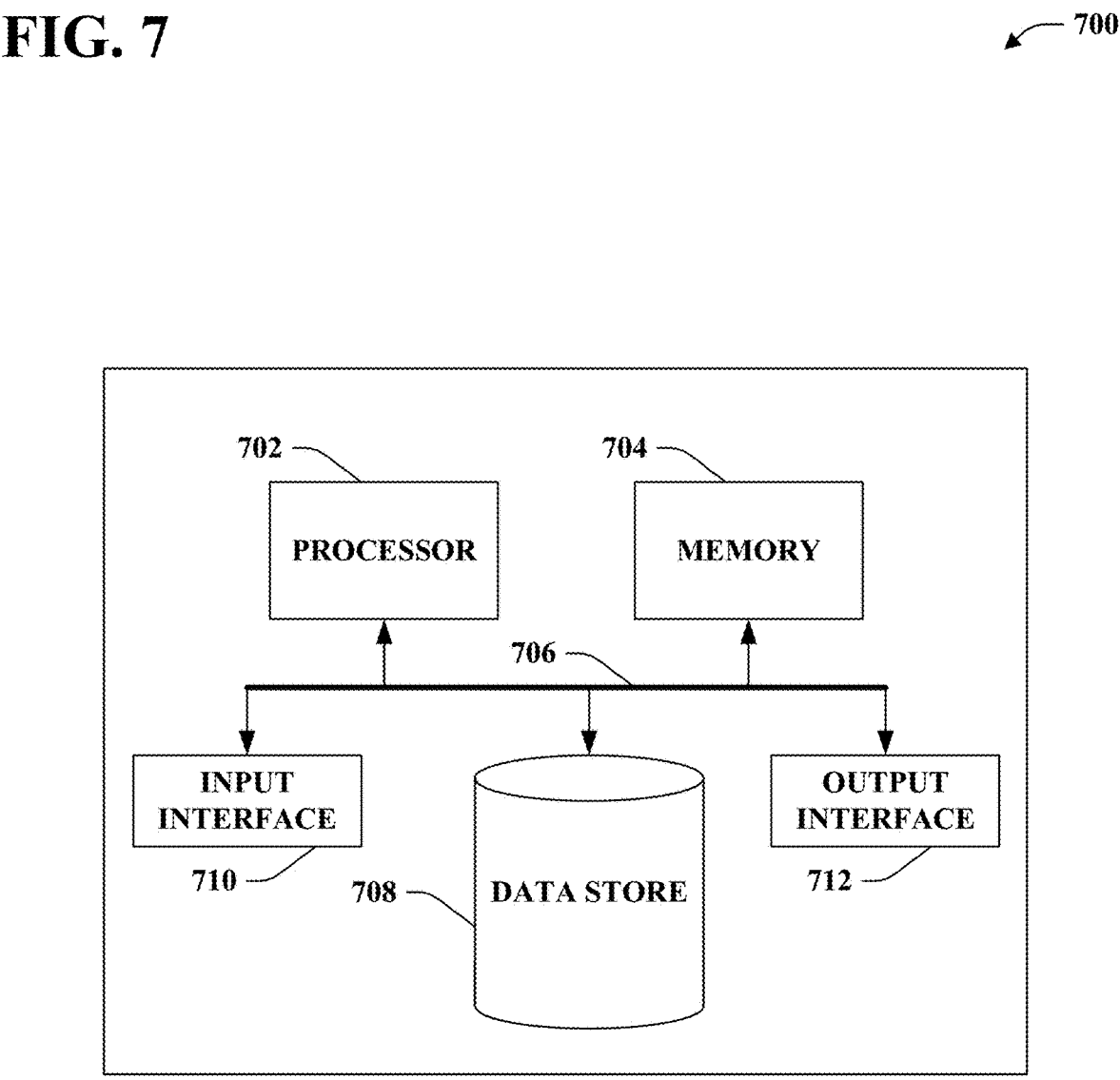
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that computes burn parameters for various stages of a rocket. By way of another example, the computing device 700 can be used in a system that controls operation of one or more systems of a rocket (e.g., the RCS system 210, the engines 108-112). The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store nominal orbit parameters, a model of motion of a rocket, data indicative of a current position and/or velocity of a rocket, etc.

The computing device 700 additionally includes a data store 708 that is accessible by the processor 702 by way of the system bus 706. The data store 708 may include executable instructions, nominal orbit parameters, a nominal orbital trajectory, a model of motion of a rocket, etc. The computing device 700 also includes an input interface 710 that allows external devices to communicate with the computing device 700. For instance, the input interface 710 may be used to receive instructions from an external computer device, from a sensor (e.g., the sensor system 212), a transceiver, etc. The computing device 700 also includes an output interface 712 that interfaces the computing device 700 with one or more external devices. For example, the computing device 700 may control devices such as actuators, motors, etc., by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A spin-stabilized rocket comprising:
   a first-stage engine;
   a second-stage engine, wherein at least one of the first-stage engine or the second-stage engine fails to include thrust vector control;
   a hardware logic device configured to control operation of the first-stage engine and the second-stage engine, wherein the hardware logic device is configured to perform the following acts:
      subsequent to completion of a burn of the first-stage engine, computing an orientation of the spin-stabilized rocket for a burn of the second-stage engine and an ignition time of the burn of the second-stage engine based upon a desired orbit parameter, a current velocity of the rocket, and a current position of the rocket; and
      causing the second-stage engine to initiate the burn of the second-stage engine at the computed ignition time when the rocket has the computed orientation, wherein the burn of the second-stage engine is configured to cause the rocket to follow a path to an orbital trajectory.

2. The spin-stabilized rocket of claim 1, further comprising a reaction control system (RCS), the RCS comprising at least one thruster, wherein the acts further comprise controlling the RCS to position the rocket to have the computed orientation.

3. The spin-stabilized rocket of claim 1, further comprising a plurality of fins, the fins configured to induce a spin of the rocket about a longitudinal axis of the rocket during a burn of the first-stage engine.

4. The spin-stabilized rocket of claim 1, further comprising a reaction control system (RCS), the acts further comprising controlling the RCS to impart a spin to the rocket about a longitudinal axis of the rocket.

5. The spin-stabilized rocket of claim 1, wherein computing the orientation of the spin-stabilized rocket and the ignition time of the burn of the second-stage engine is based upon a model of motion of the rocket.

6. The spin-stabilized rocket of claim 5, wherein the model of motion of the rocket is based upon the current velocity of the rocket and the current position of the rocket.

7. The spin-stabilized rocket of claim 1, wherein the second-stage engine is a solid-fuel rocket engine.

8. The spin-stabilized rocket of claim 1, further comprising a third-stage engine, the acts further comprising:
computing an orientation of the spin-stabilized rocket for a burn of the third-stage engine and an ignition time of the burn of the third-stage engine subsequent to completion of the burn of the second-stage engine based upon a new current position and velocity of the rocket.

9. The spin-stabilized rocket of claim 8, wherein computing the orientation of the burn of the second-stage engine and the ignition time of the burn of the second-stage engine is based further upon a burn parameter of the burn of the third-stage engine.

10. The spin-stabilized rocket of claim 1, the desired orbit parameter being at least one of an altitude at burnout of a final stage of the spin-stabilized rocket, a velocity magnitude of the spin-stabilized rocket at burnout of the final stage of the spin-stabilized rocket, or an orbit inclination.

11. The spin-stabilized rocket of claim 1, the acts further comprising:
responsive to determining that a target orbit cannot be reached by the spin-stabilized rocket, computing a salvage orbit that remains reachable by the spin-stabilized rocket, the salvage orbit being based upon the desired orbit parameter; and
wherein computing the orientation of the spin-stabilized rocket for the burn of the second-stage engine and the ignition time of the burn of the second-stage engine is based upon the salvage orbit.

12. The spin-stabilized rocket of claim 11, wherein the desired orbit parameter comprises desired orbital insertion apsides, the salvage orbit being an orbit having highest non-insertion apsides achievable by the spin-stabilized rocket given the orbital insertion apsides.

13. The spin-stabilized rocket of claim 11, wherein the desired orbit parameter comprises desired non-insertion orbital apsides, the salvage orbit being an orbit having highest insertion apsides achievable by the spin-stabilized rocket given the non-insertion orbital apsides.

14. The spin-stabilized rocket of claim 11, wherein the salvage orbit is an orbit having a lowest eccentricity achievable by the spin-stabilized rocket.

15. A method for guidance of a spin-stabilized rocket, comprising:
subsequent to completion of a burn of a first-stage engine of the spin-stabilized rocket, computing burn parameters for a burn of a second-stage engine of the spin-stabilized rocket based upon a desired orbit parameter, a current velocity of the rocket, and a current position of the spin-stabilized rocket, the burn parameters comprising an orientation of the spin-stabilized rocket during the burn of the second-stage engine and an ignition time of the burn of the second-stage engine; and
controlling the second-stage engine to initiate the burn of the second-stage engine having the computed burn parameters, wherein the burn of the second-stage engine is configured to cause the rocket to follow a path to an orbital trajectory.

16. The method of claim 15, wherein computing the burn parameters for the burn of the second-stage engine of the spin-stabilized rocket comprises solving a constraint equation based upon a point-mass model of motion of the spin-stabilized rocket, the constraint equation based upon the desired orbit parameter.

17. The method of claim 15, the desired orbit parameter being one of a desired orbit inclination or a desired orbit apsis.

18. The method of claim 15, further comprising positioning the rocket to have the computed orientation prior to causing the second-stage engine to initiate the burn of the second-stage engine.

19. The method of claim 15, further comprising:
computing second burn parameters for a burn of a third-stage engine of the spin-stabilized rocket subsequent to burnout of the second-stage engine based upon the desired orbit parameter; and
controlling the third-stage engine to initiate a burn of the third-stage engine having the computed second burn parameters.

20. A computer-readable storage medium comprising instructions that, when executed by a processor, perform the following acts:
subsequent to completion of a burn of a first-stage engine of a spin-stabilized rocket, computing burn parameters for a burn of a second-stage engine of the spin-stabilized rocket based upon nominal orbit apsides, a nominal orbit inclination, a current velocity of the rocket, and a current position of the rocket, the burn parameters comprising an orientation of the spin-stabilized rocket during the burn of the second-stage engine and an ignition time of the burn of the second-stage engine;
outputting a control signal to a reaction control system (RCS) of the spin-stabilized rocket to cause the RCS to position the spin-stabilized rocket to have the computed orientation; and
outputting a control signal to the second-stage engine to cause the second-stage engine to initiate the burn of the second-stage engine at the computed ignition time.

* * * * *